(No Model.)  
3 Sheets—Sheet 1.

E. G. SMITH.
IRONING MACHINE.

No. 575,859.  
Patented Jan. 26, 1897.

Fig. 1.

Witnesses  
Chas. A. Ford.  
R. M. Smith.

Inventor  
Ernst G. Smith,  
By his Attorneys.  
C. A. Snow & Co.

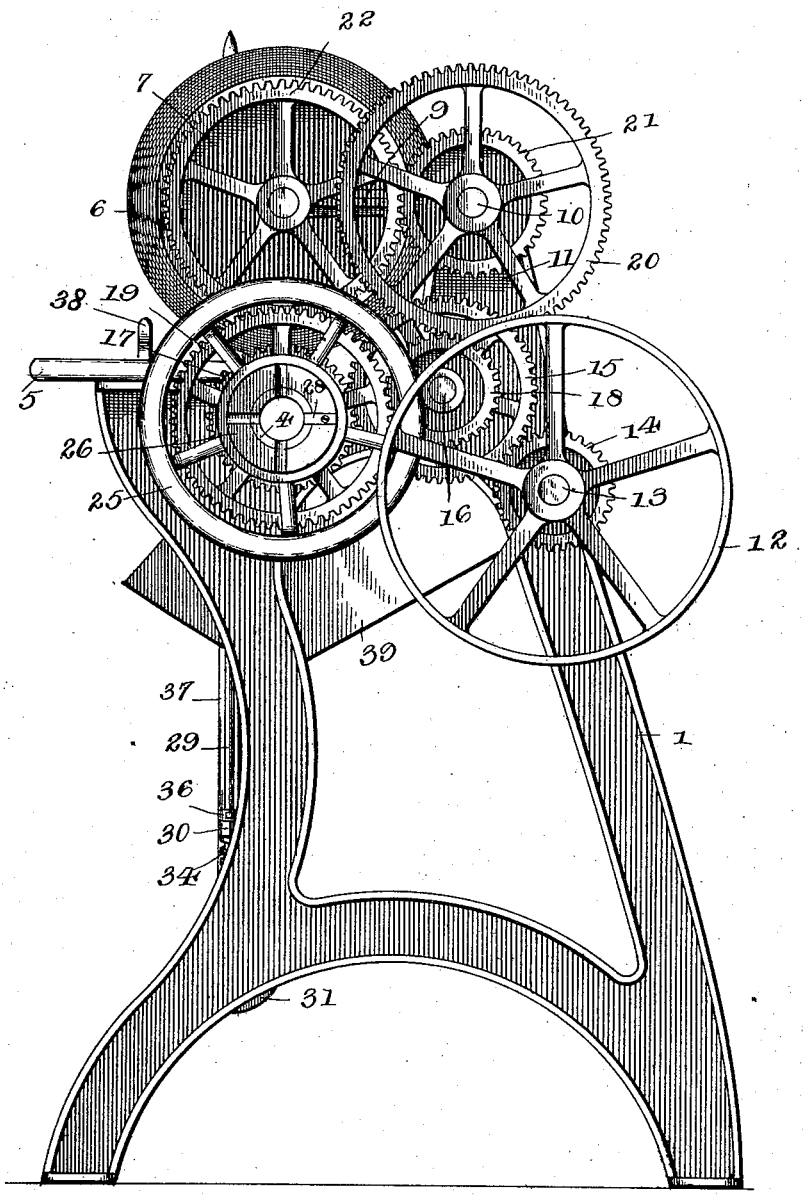

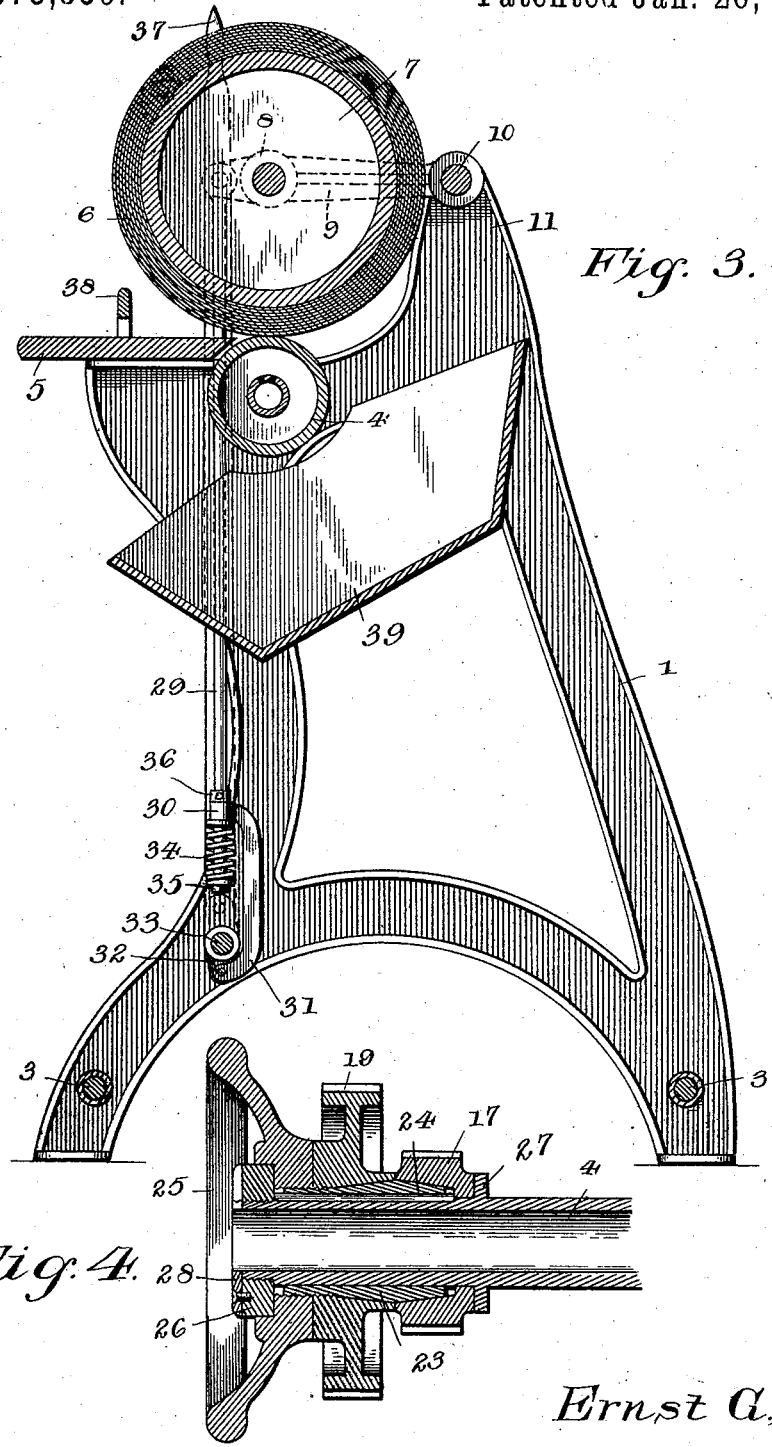

UNITED STATES PATENT OFFICE.

ERNST G. SMITH, OF COLUMBIA, PENNSYLVANIA.

IRONING-MACHINE.

SPECIFICATION forming part of Letters Patent No. 575,859, dated January 26, 1897.

Application filed July 23, 1895. Serial No. 556,899. (No model.)

*To all whom it may concern:*

Be it known that I, ERNST G. SMITH, a citizen of the United States, residing at Columbia, in the county of Lancaster and State of Pennsylvania, have invented a new and useful Ironing-Machine, of which the following is a specification.

This invention relates to an improvement in ironing-machines such as are used in laundries for finishing collars, cuffs, &c.

The invention herein contemplated, while designed especially for collar and cuff machines, may, it will be apparent from the ensuing description, be applied to various kinds of ironing-machines, such as body-ironers, sleeve-ironers, shirt-ironers, and band-ironers.

The object of the present invention is to provide, in connection with the differential-speed gearing of an ironing-machine, a novel form of clutching or shifting device, by means of which the speed at which the hot or ironing roll is driven may be varied in such manner as to produce a very slight gloss, or what is known as a "domestic" finish, or a gloss finish, or, if desired, a dead finish entirely without gloss.

A further object of the invention is to provide a novel construction of pressure device which may be operated by means of a lever within convenient reach of the attendant for affording any desired pressure between the hot and padded rolls, at the same time allowing the padded roll to yield relatively to the hot roll for allowing goods of unequal or uneven thickness to pass between the same.

Other objects and advantages of the invention will appear in the course of the subjoined description.

The invention consists in an improved ironing-machine embodying certain novel features and details of construction and arrangement of parts, as hereinafter fully described, illustrated in the drawings, and finally pointed out in the claims.

In the accompanying drawings, Figure 1 is a perspective view of an improved ironing-machine constructed in accordance with this invention. Fig. 2 is an end elevation of the same with the gear-inclosing case removed to show the differential-speed gearing. Fig. 3 is a vertical cross-section through the machine. Fig. 4 is an enlarged detail longitudinal section through one end of the shaft of the hot roll, showing the means for throwing the gears mounted upon said shaft into and out of engagement with the same.

Similar numerals of reference designate corresponding parts in the several figures of the drawings.

Referring to the accompanying drawings, the machine-frame is composed of opposite end members 1, each preferably formed from a single casting and connected at suitable points by means of tie-bolts 2 and spacing-sleeves 3. The members 1 of the frame are spaced a sufficient distance apart to receive between them a hollow cylindrical metal roll 4 of any desired length, such roll constituting what is known as the "hot" roll of the machine. This roll extends longitudinally of the machine and is mounted in bearings in the end members of the frame in such manner as to bring its upper surface in about the same plane with the upper surface of a table 5, which consists, preferably, of a board of suitable width extending longitudinally of the machine and resting at its opposite ends upon the end members of the frame, to which it is bolted or otherwise secured.

The roll 4, as above stated, is made hollow or formed with a longitudinal bore extending entirely through the same, and this roll is usually heated by introducing therein a pipe provided with a plurality of perforations, to which gas and air are admitted by means of suitable valves arranged at one end of the machine in the usual manner.

6 designates the padded roll, which is arranged above the hot roll and is of considerably larger diameter, being also in the form of a hollow cylinder, having closed ends 7, which form the bearings for the shaft upon which said roll revolves. The shaft of the padded roll is mounted at each end in the sleeve 8 of a swinging arm 9, and these swinging arms are extended rearwardly in an approximately horizontal plane, where they are keyed or otherwise rigidly secured to a longitudinal shaft 10, which is mounted at its ends in vertical extensions 11 of the end members of the machine-frame, as indicated in Figs. 2 and 3. By means of this construction it will be seen that the padded roll is hinged relatively to the machine-frame and is capable of vibrating upon the shaft 10 as a center.

Motion is communicated to the machine by means of a belt passing around a pulley 12, mounted upon the driving-shaft 13 of the machine. Upon this shaft is also mounted a spur-pinion 14, which meshes with a spur-wheel 15, revolubly mounted upon a stud-shaft 26, projecting laterally from the adjacent end member of the frame. The wheel 15 gears with a spur-pinion 17 on the hot roll, and also carries with it a spur-pinion 18, which meshes with a spur-gear 19, also mounted upon the hot roll adjacent to the pinion 17. The spur-pinion 18 is also constantly in mesh with a spur-gear 20, mounted upon the shaft 10, above referred to, said last-named gear carrying with it a pinion 21, which meshes with a spur-wheel 22, keyed to the shaft of the padded roll.

By means of the train of gearing above described motion is readily imparted to both the hot and padded rolls, and by means of a novel form of clutch or shifting mechanism, hereinafter described, it is possible to throw either the small gear 17 or the large gear 19 into engagement with the hot roll for the purpose of changing the speed thereof. It will also be apparent from the foregoing description that the padded roll will always be driven at a uniform speed, and that by reason of the particular manner in which the padded roll is hinged with relation to the shaft 10, and the mounting of the padded-roll-driving gears 20 and 21 upon the same shaft 10, the padded roll may be adjusted in height without interfering with its operation, and said roll will always gear evenly with its driving mechanism, no matter how heavily the same may be padded or how thick may be the goods passing between the hot and padded rolls.

Referring to Fig. 4, it will be seen that the hot roll 4 is provided at one end with a surrounding sleeve 23, the same being feathered thereto by means of a spline 24, thus adapting said sleeve to revolve with the hot roll and to have a longitudinal sliding movement thereon. This sleeve 23 is formed with a reversely-tapered exterior surface, constituting what may be termed a "double cone," one portion of which, upon one side of the greatest diameter of such double cone, enters a corresponding conical recess in the center of the small gear 17, while the reversely-tapered portion of said double cone enters a corresponding conical recess in the center of the large gear 19, the greatest diameter of the double cone lying normally adjacent to the contiguous inner faces of said gears, as illustrated in Fig. 4. The outer end of the sleeve 23 is externally screw-threaded, as shown, adapting it to receive and be engaged by an internally-threaded hand-wheel 25, surrounding the same and held in place by means of a collar 26, which is formed with a threaded perforation and screwed upon the threaded extremity of the hot roll. The outer face of the collar 26 is formed with a series of radial depressions which correspond with a similar series of notches or depressions in the end of the hot roll, the same being adapted to receive a key or locking-plate 28, by means of which said collar may be fixed upon the end of the hot roll and prevented from unscrewing therefrom. By removing the key or locking-plate 28 the collar 26 may be adjusted inward or outward upon the hot roll and locked at any desired point. This is to establish the proper distance between the inner face of the collar 26 and the adjacent face of a fixed collar 27, formed integrally with or secured to the hot roll just inside of the small gear 17. By means of this construction it will be seen that when the hand-wheel 25 is turned to the right the conical sleeve 23 will be thrust inward in such manner as to engage the small gear 17 and cause the same to revolve with the hot roll. In the same manner by turning the hand-wheel to the left the conical sleeve 23 will be drawn outward, thus wedging into the large gear 19, and causing the same to revolve with the hot roll, at the same time releasing the small gear 17. By adjusting the sleeve 23 to an intermediate position it will be seen that both of the gears will be released and left free to revolve independently of the hot roll. Under the adjustment first described the hot roll will be driven at high speed and will produce what is known as the "gloss" finish upon the goods being ironed, while under the second adjustment the surface speed of the hot roll will more nearly approximate the surface speed of the padded roll and thereby produce a domestic finish. Under the last-described adjustment the hot roll will be driven by its contact with the padded roll and will therefore partake of the same surface speed, the result of which will be a dead finish without any gloss whatever. The adjustment described is the work of an instant and will greatly facilitate the change to the desired finish.

The manner in which the padded roll is adjusted and the means for regulating the pressure thereof with relation to the hot roll will now be described. Each of the sleeves 8 of the swinging arms 9 above described is formed with outwardly-extending twin lugs, between which is pivotally secured the upper end of a pressure-rod 29. Two of these rods are employed, one at each end of the machine, and the same are extended downwardly through sleeves 30 at the upper ends of a pair of U-shaped yokes 31, said yokes being extended at their lower ends under the rock-shaft and pivotally secured at such ends to cranks 32, fixedly mounted upon a rock-shaft 33, journaled in the end members of the machine-frame. The lower end of each pressure-rod 29 has a spiral spring 34 disposed around the same, said spiral spring bearing at its upper end beneath the sleeve 30 of the yoke 31 and being upheld at its lower end by means of a washer and nut 35 upon the lower extremity of said rod. By adjusting the nut 35 the spring 34 may be caused to act with greater or less force upon the pressure-rod 29, thereby drawing the padded roll 6 with any desired pressure against the hot roll 4. A stationary collar 36 surrounds each pressure-rod 29 just above the sleeves 30, so that when the rock-shaft 33 is turned and the cranks 32 thereof vibrated the yokes will be caused to elevate the pressure-rods and thereby lift the padded roll out of contact with the hot roll. The rock-shaft 33 is operated by means of a vertically-extending lever 37, mounted upon the same at one end of the machine and extending upwardly above the machine-table and within convenient reach of the attendant.

By means of the construction described and by reason of the particular shape of the U-shaped yoke at each end of the frame, the lower end of which yoke extends under the rock-shaft when the lever 37 is moved in the proper direction, the pivotal point of connection between the yoke and the crank on the rock-shaft will be carried past a line drawn through the rock-shaft and the point of connection between the pressure-rod and swinging arm, in which the shaft of the padded roll is journaled. When the parts are in this position, it will be seen that the padded roll will be locked against the ironing-roll and only enabled to yield by reason of the presence of the coiled springs 34.

38 designates a finger-guard which is mounted upon the upper surface of the table 5, the same being provided with downwardly-extending feet at opposite ends thereof, thus forming a space beneath the guard proper, through which the goods to be ironed may be introduced between the rolls, while preventing the fingers of the attendant from being caught.

The machine is also provided with a tray 39 for catching the goods delivered from between the rolls, and the differential gearing is inclosed within a suitable metal casing 40.

By the construction above described it will thus be seen that the machine may be quickly adjusted to produce either a gloss or a domestic or a dead finish to the goods being ironed and that the padded roll may be pressed against the hot roll with any desired force or be rocked entirely out of contact therewith.

Various changes in the form, proportion, and the minor details of construction may be resorted to without departing from the spirit or sacrificing any of the advantages of this invention.

Having thus described the invention, what is claimed as new, and desired to be secured by Letters Patent, is—

1. In an ironing-machine, the combination with the ironing-roll, of a longitudinally-movable sleeve having a feather-and-spline connection therewith, a fixed collar on said roll, gear-wheels journaled on said sleeve, a hand-wheel for moving said sleeve into frictional engagement with the hub of either one of said wheels, an adjustable collar having a screw-threaded connection with said roll and formed with facial grooves or depressions corresponding with similar grooves or depressions in the end of the ironing-roll, and a detachable key or locking-plate in engagement with the grooves of the roll and hand-wheel, providing for the adjustment of said collar longitudinally of the roll and its retention at the desired point, substantially as specified.

2. In an ironing-machine, the combination with the ironing-roll, and the padded roll adjustable toward and away from the ironing-roll and journaled in swinging arms, of a pressure-rod pivotally connected at one end to one of said arms, a rock-shaft journaled in the machine-frame, a U-shaped yoke having one end extended under the rock-shaft and pivotally connected to a crank-arm on said shaft and provided with a sleeve surrounding the pressure-rod so as to allow the latter to move longitudinally therethrough, a coiled spring surrounding the lower end of said pressure-rod beneath the sleeve of the yoke, and provision for adjusting the tension of said spring and correspondingly adjusting the pressure of the padded roll against the ironing-roll, the yoke being extended under the rock-shaft in such manner that its pivotal point of connection with the crank on the rock-shaft will pass across and beyond a line drawn through the rock-shaft and the point of connection between the pressure-rod and swinging arm, thereby serving to lock and hold the padded roll against the ironing-roll, substantially as described.

In testimony that I claim the foregoing as my own I have hereto affixed my signature in the presence of two witnesses.

ERNST G. SMITH.

Witnesses:
F. P. D. MILLER,
GEO. D. MILLER.